(12) United States Patent
Rainey

(10) Patent No.: US 10,280,123 B2
(45) Date of Patent: May 7, 2019

(54) SOLUBLE FERTILIZER PRODUCT

(71) Applicant: Easy Gardener Products, Inc., Waco, TX (US)

(72) Inventor: Martin Rainey, Waco, TX (US)

(73) Assignee: Easy Gardener Products, Inc., Waco, TX (US)

( * ) Notice: Subject to any disclaimer, the term of this patent is extended or adjusted under 35 U.S.C. 154(b) by 102 days.

(21) Appl. No.: 15/477,001

(22) Filed: Apr. 1, 2017

(65) Prior Publication Data

US 2017/0283335 A1    Oct. 5, 2017

Related U.S. Application Data

(60) Provisional application No. 62/317,494, filed on Apr. 1, 2016.

(51) Int. Cl.
| | | |
|---|---|---|
| *C05F 11/08* | (2006.01) | |
| *C05D 3/02* | (2006.01) | |
| *C05D 3/00* | (2006.01) | |
| *C05F 11/02* | (2006.01) | |

(52) U.S. Cl.
CPC ............. *C05F 11/08* (2013.01); *C05D 3/00* (2013.01); *C05D 3/02* (2013.01); *C05F 11/02* (2013.01)

(58) Field of Classification Search
CPC . C05F 11/08; C05F 11/02; C05D 3/02; C05D 3/00

See application file for complete search history.

(56) References Cited

FOREIGN PATENT DOCUMENTS

CN     104478620 A  *  4/2015

OTHER PUBLICATIONS

Moissl-Eichinger, Christine. "Archaea in artificial environments: their presence in global spacecraft clean rooms and impact on planetary protection." The ISME journal 5.2 (2011): 209.*
Jobe's Organics Bursting Blooms Water Soluble Plant Food. Safety Data Sheet. pp. 1-7. Oct. 21, 2015.*

* cited by examiner

*Primary Examiner* — Jennifer A Smith
(74) *Attorney, Agent, or Firm* — John A. "Andy" Powell

(57) ABSTRACT

A fertilizer that may be comprised of water soluble soy protein and one or more species of beneficial microbes that aid in plant nourishment and soil enhancement, where the beneficial microbes may be Bacteria or Archae microbes.

25 Claims, No Drawings

SOLUBLE FERTILIZER PRODUCT

This application claims the benefit of U.S. Provisional Application No. 62/317,494 filed on Apr. 1, 2016.

BACKGROUND OF THE INVENTION

Plant growth is affected by a variety of environmental factors including available light, available water, and available nutrients in the soil. The six primary nutrients required by plants are carbon, hydrogen, oxygen, nitrogen, phosphorous, and potassium. Plants obtain carbon, hydrogen, and oxygen from the available air and water that is present in the environments where they are growing. Plants also obtain necessary nitrogen, phosphorous, and potassium (sometimes referred to as "macronutrients") from the soil that is present in the environments where they are growing. Unfortunately, these macronutrients are often not available in ideal amounts for maximum plant growth and crop production. This problem occurs both in areas where the soil is naturally of a poor quality with low macronutrient and micronutrient content, and also in areas where the soil was initially rich in macronutrient and micronutrient content, but where the natural amounts of these macronutrients and micronutrients have been reduced and depleted by intensive farming, or in the residential setting, through repeated annual gardening. Poor plant growth and low crop yields are often a result of poor soil quality and depletion of macronutrients and micronutrients through agricultural activities.

It is well known that in environments where the soil is either of poor quality or where macronutrients and micronutrient levels have been depleted due to agricultural or gardening activities, plant growth may be assisted by the application of nutrient fertilizers to the soil, wherein the nutrient fertilizers will contain one or more of macronutrients nitrogen, phosphorous and potassium. These three macronutrients are fundamentally important to plant growth, and repeated application of nutrient fertilizers to the soil where plants are grown will often make the soil more fertile. A nutrient fertilizer (sometimes simply referred to as a "fertilizer") is a physical composition of matter that is added to soil or is foliar fed to nascent or growing plants in order to provide nutrients that increase plant growth and maximize crop yields. While fertilizers almost always supply one or more macronutrients that are required for plant growth, they may also supply other micronutrients and trace minerals that aid in plant growth. Fertilizers may be of either a natural or synthetic origin.

Nutrient fertilizers almost universally provide one or more primary plant macronutrients, such as nitrogen, phosphorous, and potassium, all of which when present in a fertilizer will help supplement the naturally occurring amounts of these macronutrients found in the soil where the plants are growing. By far the most important macronutrient related to plant growth is nitrogen. As a result, nutrient fertilizers are normally applied to the soil surrounding growing plants in order to provide additional nitrogen to the soil for plant uptake, or in some instances they may be applied directly to the foliage of growing plants. Application of nutrient fertilizers containing additional nitrogen for plant use is often essential to achieving desired increased growth of row crops or garden plants. Thus, fertilizers generally contain a nitrogen source in one form or another. In addition to nitrogen, phosphorous and potassium are extremely important in plant growth, and therefore many fertilizers also contain the macronutrients phosphorous and potassium in one form or another. Nutrient fertilizers may also provide secondary plant micronutrients such as calcium, sulfur, and magnesium, along with trace minerals such as boron, chlorine, manganese, magnesium, iron, zinc, copper, molybdenum, and selenium, all of which are also valuable in promoting crop growth and in promoting the health of row crops in agriculture and also garden plants in the residential setting.

Traditional fertilizers comprised of varying combinations of inorganic salts of the various plant macronutrients and micronutrients have been used in commercial agriculture and in residential gardening for many decades. Such commercially-sold, traditional fertilizers have been comprised of various synthetically created inorganic salts of the macronutrients and micronutrients that are made through chemical processing of raw materials. Traditional fertilizers comprised of inorganic salts are normally produced without anything more added to the inorganic salts found in the traditional fertilizers that might aid in the breakdown/decomposition and assimilation of such inorganic salts by growing plants and within the soil surrounding growing plants. Such traditional fertilizers have been sold in both granular and liquid mixture forms, and they are often applied to the soil in which the plants are growing at specific times before and during the growing season. Once applied to the soil where plants are growing, exposure of the inorganic salts within the fertilizer to irrigation water or rainwater in the environments where the growing plants are located will normally allow some of these inorganic salts to dissolve in the water, soak into the soil, and become available for uptake by plant roots and root material, which ultimately aids plant growth and increases crop yields in commercial agriculture and in residential gardens.

While traditional nutrient fertilizers containing inorganic salts of common plant macronutrients and micronutrients have proven to be highly beneficial with regard to achieving increased crop yield and plant growth in commercial agriculture and with residential lawns and gardens, the repeated application of highly soluble fertilizers containing a variety of inorganic salts to row crops, gardens, or lawns has also created a number of well-recognized problems. For instance, the inorganic salts contained within such traditional fertilizers are often dissolved by irrigation water or rainwater and are carried by water runoff or through tile drainage into adjacent or nearby creeks, streams or other waterways and are thereby eventually transported to larger bodies of water such as rivers, ponds, lakes, and oceans. The resulting eutrophication of large bodies of water caused by runoffs and drainage of dissolved inorganic salts from traditional commercial fertilizers, primarily the inorganic nitrogen and phosphorous salts, results in unintentional overgrowth of phytoplankton and algal blooms in these large bodies of water. It is well understood that these overgrowths of phytoplankton and algal blooms are principally due to the runoff and drainage of traditional fertilizers because when large quantities of dissolved nitrogen and phosphorous salts from the traditional fertilizers are made available to such single-celled organisms found in bodies of water, they are no longer limited in their growth by relatively low levels of nitrogen and phosphorous that are naturally found in the bodies of water where they are growing. These overgrowths of phytoplankton and algal blooms frequently lead to the development of large hypoxic areas known as "dead zones" in lakes, oceans, and other large bodies of water around the world. Most aquatic animals cannot survive in such dead zones, which causes fish and other aquatic life to die, having a deleterious effect on the ecosystem and on human activities such as commercial fishing and the sport fishing industries.

These large hypoxic or anoxic dead zones primarily result from extreme use of available dissolved oxygen during the subsequent decay and decomposition of the overgrowths of phytoplankton and algae in the water. Algal blooms can also cause significant odor and taste problems in areas where municipal water supply is from a river or lake where significant algal blooms have developed as a result of increased dissolved phosphorous and nitrogen levels due to fertilizer runoff. The influx of dissolved inorganic salts of nitrogen and phosphorous in such bodies of water can also increase growth of other undesirable aquatic plants and various weeds, which in turn can lead to an increase in odor and taste problems and can also contribute to oxygen-poor aquatic environments that harm or kill desirable aquatic animals and plants.

While it is recognized that nitrogen is the single most important macronutrient in virtually all types of fertilizers, nitrogen in the form of soluble nitrates in traditional fertilizers is particularly potent and harmful because such nitrates in the soil are very easily dissolved and carried away by irrigation and rainwater. Additionally, phosphorous in the form of soluble phosphates contained within many traditional fertilizers is also very easily dissolved in rainwater and irrigation. The drainage and runoff of water containing dissolved nitrates and phosphates and the transport of those dissolved inorganic salts into large bodies of water leads to the eutrophication problems discussed above.

Another recognized problem with the use of traditional fertilizers containing various inorganic salts of the common plant macronutrients and micronutrients is that such fertilizers are often associated with "fertilizer burn" that damages the plants in the area that has been fertilized. Fertilizer burn occurs when the highly soluble inorganic salts of the traditional fertilizers that have been introduced into the soil through repeated fertilizer application begin to accumulate in large amounts in the soil near plant roots and root material. This results in the high amounts of the accumulated inorganic salts hygroscopically absorbing water from the soil and thereby pulling water away from the roots and root materials of the plants that the fertilizers were initially intended to benefit, which ultimately results in dehydration of the plants. Such dehydration of the plants may lead to death of the plants, or at the very least, low crop yield. In a more extreme variation of this problem, long term use of nutrient fertilizers containing a variety of inorganic salts can lead to significant mineralization of the soil in which the inorganic salts are present in large amounts in mineralized forms that are not readily available for plant uptake, which results in an overall loss of soil fertility. Furthermore, traditional fertilizers containing only inorganic salts and other highly chemically processed components such as urea, ammonia, ammonium nitrate, phosphoric acid, ammonium phosphate, and calcium phosphate are generally not used by organic farmers and organic gardeners, yet organic food production and organic gardening are increasingly important in the global economy and fertilization of the soils in which those crops are grown is also frequently necessary.

In order to avoid the recognized problems inherent in using traditional fertilizers comprised of highly chemically processed and highly soluble inorganic salts of nitrogen, phosphorous and other macronutrients and micronutrients, a number of natural organic fertilizer alternatives have been developed within the last few decades. Many of these organic fertilizers principally rely upon animal proteins or plant proteins as the primary source for the nitrogen and other macronutrients and micronutrients that are needed for increased plant growth. Historically in premodern times, animal waste and animal manure was applied to the soil in agricultural settings in order to enrich the soil and aid plant growth. Today there are a variety of organic fertilizers that are manufactured and sold which contain animal waste or animal manure as the primary source of nitrogen. For instance, organic fertilizers may contain manure from cows, pigs, chickens or other domesticated animals that serve as the primary or sole nitrogen source in the fertilizer. Organic fertilizers that are principally comprised of agricultural or aquacultural byproducts frequently provide nitrogen in the form of the proteins found in substances such as blood meal, feather meal, bone meal, bone ash, fish meal or eggshells, and other similar animal-based byproducts are also known. Additionally, organic fertilizers comprised primarily of plant-based proteins and plant materials have been produced. For instance, organic fertilizers containing alfalfa meal, flax seed meal, cottonseed meal, or soy meal are also known. The organic fertilizers generally provide nitrogen, phosphorous, potassium, calcium, iron, and other macronutrients, micronutrients, and trace minerals for enhanced plant growth by virtue of natural biological decomposition in the soil after application.

Use of natural organic fertilizers is advantageous for many reasons. First, natural organic fertilizers are often by-products of other agricultural industries, such as row crop agriculture, animal husbandry, or aquaculture. Moreover, natural organic fertilizers do not normally leach into nearby or surrounding rivers and streams at nearly as high a rate as a result of irrigation and rainwater runoff. Such natural organic fertilizers also will not result in over-mineralization of the soil because of their relatively low level of pure inorganic salt content. Moreover, fossil fuels are not intensively used for the specific production of natural organic fertilizers, which also reduces the carbon emissions resulting from the preparation of such fertilizers. Use of such organic fertilizers also tends to reduce the amount of nitrates in the foods that are grown and later consumed, which may have positive health benefits.

Use of natural organic fertilizers based upon plant or animal proteins is also supported by the fact that the animal or plant based proteins that are their nitrogen source contain substantial amounts of nitrogen. In general, every kilogram of protein contains approximately 160 grams of nitrogen. Organic fertilizers based on animal or plant proteins commonly contain between 4% and 12% nitrogen. They also are good sources of other essential macro and micronutrients such as phosphorous, calcium, potassium, and iron. However, as noted above, such animal or plant proteins require a certain amount of natural biological decomposition to occur after application of the organic fertilizers to the soil in which the plants are being grown. As a result, natural organic fertilizers used in plant cultivation and agriculture are characterized by low efficiency, and large quantities must be applied in order to significantly increase plant growth and crop yield. Another issue with such natural organic fertilizers is that the animal or plant based proteins that are the nitrogen source frequently are not provided in soluble form.

In an effort to resolve the issues with the use of natural organic fertilizers, bioorganic fertilizers have been developed that are comprised of natural organic fertilizer materials mixed with selected livings microbes that have been studied and empirically shown to help decompose plant and animal proteins found in natural organic fertilizers in a manner that makes the natural organic fertilizers more efficient. The microbes in these bioorganic fertilizers often will colonize the rhizosphere and will work in a mutualist manner to increase the supply and availability of macronutrients and water to the growing plants. The microbes contained within bioorganic fertilizers are living organisms that typically assist growing plants by decomposing organic materials and then supplying macronutrients and micronutrients obtained in that process to growing plants. The microbes may assist in nitrogen fixation, solubilizing phosphorous, stimulating plant growth.

Bioorganic fertilizers are activated by the microbial constituents they contain in the sense that after application of the fertilizers to the soil, the microbes contained within the fertilizer begin to decompose and reduce the animal or plant proteins found in the fertilizer to useful components that are more readily absorbed and used by the growing plants. In many cases, the microbes of the bioorganic fertilizers also mutualistically or commensally promote absorption of nutrients by the plant root system and rhizome through a symbiotic relationship with the roots and root materials. Such microorganisms may also help enhance soil fertility by fixing atmospheric nitrogen, breaking down minerals in the soil, and in decompacting and aerating the soil, all of which results in greater soil permeability for irrigation and rain water uptake by plant roots and ultimately enhances soil fertility.

One disadvantage of many bioorganic fertilizers is that they are not water soluble. While most or all inorganic fertilizers are highly water soluble, and while there are some organic fertilizers that are water soluble, there are few if any water soluble bioorganic fertilizers that contain a water soluble plant protein as the nitrogen source and a microbial component to aid in decomposition of that plant protein in the soil into usable macronutrients and micronutrients for enhancing and promoting plant growth. As a result, there is a need for additional soluble bioorganic fertilizers that are based primarily on plant proteins and that contain microbe packages to assist in nutrient uptake by plants. Furthermore, while current bioorganic fertilizers may contain microbes that enhance soil fertility in the manner described above, they do not typically contain microbes that specifically aid in soil remediation and improve previously contaminated soil by decomposing pesticides, herbicides, and other man made chemicals that are present in the soil in a manner enhances soil fertility and that aids in plant growth. Many bioorganic fertilizers also do not typically contain components that aid in the demineralization of previously overmineralized soil.

TECHNICAL FIELD OF THE INVENTION

The present invention relates to fertilizers for providing nutrients to plants to increase plant growth, and specifically relates to water soluble bioorganic fertilizers containing plant protein as a primary nitrogen source along with certain growth enhancing microbial and fungal constituents.

SUMMARY OF THE INVENTION

The fertilizer product hereby disclosed is a bioorganic, water-soluble fertilizer product that is comprised of water soluble soy protein and one or more specific microbial organisms, and may also include fungal components that are beneficial to soil fertility enhancement and plant growth. The amino acids contained within the soluble soy protein are the fertilizer's primary source of nitrogen, which is the most important macronutrient for plant growth. It is well understood that the amino acids in soy protein are nitrogen-containing compounds that are useful as a fuel source for the Nitrogen Cycle in the soil that is essential for plant growth.

The microbial components and optional fungal components that are used in the fertilizer are helpful microorganisms that potentially enhance one or more of the following: the Nitrogen Cycle generally, Nitrification, or Nitrogen Fixation. Certain of the microbial components that may be used in the fertilizer are also helpful in breaking down rock and minerals encountered in the soil in order to render necessary macronutrients, micronutrients and trace minerals more accessible and usable by growing plants. At least one of these microbial components that may be used in the fertilizer also has the demonstrated ability to breakdown potentially harmful molecules in the soil such as pesticides, herbicides, fungicides, and other man-made inorganic and synthetic organic compounds, thereby enhancing soil health and plant growth.

The main embodiment of the fertilizer product disclosed herein is comprised of water soluble soy protein and Archae microbes (which are sometimes individually referred to as an "Archaeon" microbe). The Archae microbes used in the fertilizer aid in the Nitrogen Cycle and are helpful in breaking down rocks and minerals in the soil. The Archae microbes contained within the fertilizer product also increase the health and fertility of the soil generally by breaking down and decomposing harmful man-made compounds and synthetic molecules that may exist in the soil, including pesticides, herbicides, fungicides, and the like, thereby making the soil more hospitable and fertile for plant growth.

Archae constitute a kingdom of single-celled microorganisms. Archae are prokaryotic microbes that were originally classified as archaebacterial, but such classification is now obsolete because it is now recognized that Archae cells have unique features that are different from the two other domains of life, Bacteria and Eukaryota. Most well-known Archae species are members of one or the other of two main phyla, the Euryarchaeota and Crenarchaeota. Archae are believed to have been present on Earth for several billion years. Archae are found in a variety of habitats around the Earth, and many Archae species thrive in extreme environments featuring high temperatures, high salinity, or highly acidic or alkaline water. Archae are also found in more temperate environments such as marshlands, oceans, soils, and even within organs of the human body. Some Archae appear to assist with the Carbon Cycle, playing a role in the decay and decomposition of organic materials. Other species of Archae play a role in the Nitrogen Cycle. These Archae are commensals and associate with plat roots and rhizomes in the soil in order to assist with nitrate assimilation and nitrogen fixation. Many species of Archae also have a demonstrated ability to break down hydrocarbons and man-made chemical contaminants into naturally occurring compounds and trace elements. For this reason, some species of Archae have previously been used in the bioremediation of oil spills. While there are two main phyla of Archae, there are many other identified phyla of Archae, and the total number of Archae species is unknown. The particular Archae species used in the preferred embodiment of the fertilizer product disclosed herein is *Nitrosopumilus maritimus*, a species that has previously been used in bioremediation of contaminated soils and oil spills.

The fertilizer product disclosed herein may also be comprised of Mycorrhizae fungal spores. The Mycorrhizae fungal spores used in the fertilizer product may be Endomycorrhizae, Ectomycorrhizae, or a combination of both. These fungal spores enhance plant roots' health and function in a primarily mutualistic manner and aid in growing plants' uptake and assimilation of nutrients, water, and minerals.

While the plant roots provide a ready source of carbohydrates to the fungi, the fungi mycelium and hyphae have a greater ability to absorb water and mineral nutrients from the soil and the surrounding organic materials and to provide that greater uptake of water and minerals to the plant root cells. Mycorrhizal fungi mutualism with plant roots and rhizomes involves either the fungi penetrating plant tissues and root cells or forming intercellular connections and sheaths that are in direct contact with the cells of the root mass and rhizome and then working symbiotically with the plant to more effectively take in water and nutrients needed by the plants. The symbiotic relationship benefits the growing plants and allows them to uptake nutrients from the soil more efficiently and in greater amounts than would otherwise occur without the mycorrhizal fungi being present in the symbiotic relationship. In fact, a few plant species are not capable of surviving without the presence of mycorrhizal fungi in the soil in which they are grown. The Mycorrhizae spores that may be included with the soy protein, the Archae microbes, and the bacterial microbes in the fertilizer product disclosed hereby include spores of one or more of the following Mycorrhizae that are listed below in tabular format:

| Endomycorrhizae | Ectomycorrhizae |
|---|---|
| Glomus intraradices | Pisolithus tinctorius |
| Glomus etunicatum | Scleroderma cepa |
| Glomus mosseae | Scleroderma citrinum |
| Glomus aggregatum | Rhizopogon villosulus |
| | Rhizopogon amylopogon |
| | Rhizopogon fulvigleba |

The fertilizer product disclosed herein may also be comprised of beneficial bacterial microbes. Many bacteria have an important role in the Nitrogen Cycle and aid in nitrogen fixation and also in plants' uptake of available nitrogen for plant growth. Plant growth-producing bacteria are beneficial root-colonizing bacteria that aid in nitrogen fixation and in plants' uptake of useful macronutrients and micronutrients. A number of bacterial species have been empirically shown to increase plant growth, reduce salt uptake of plants, protect against plant diseases, and increase plant yield through nutrient uptake. For instance, phosphorous solubilizing bacteria aid in plant growth and development by solubilizing phosphates and rendering the phosphorous into usable form for plants. Other species of bacteria are beneficial to plant growth due to production of bacterial metabolites that serve as antibiotics which reduce damage to the plant due to plant diseases. The bacterial microbes that seem to be of most benefit with regard to enhanced plant growth in connection with the fertilizer embodiments discussed herein are *Bacillus subtilis, Bacillus lichenformis*, and *Paenibacillus Durum*. Thus, any one or more of *Bacillus subtilis, Bacillus lichenformis*, and *Paenibacillus Durum* microbes may be added to the embodiments of the fertilizer product disclosed herein in order to further enhance plant growth, though other beneficial bacteria species may also be used.

The preferred embodiment of the fertilizer disclosed herein is comprised of water soluble soy protein, Archae microbes, selected Mycorrhizae fungal spores, and selected beneficial bacterial microbes. The preferred embodiment contains the Archae known as *Nitrosopumilus maritimus*. The preferred embodiment contains the following bacterial microbes: *Bacillus subtilis, Bacillus lichenformis*, and *Paenibacillus durum*. The preferred embodiment is further comprised of Mycorrhizae fungal spores. The Mycorrhizae spores included with the soy protein, the Archae microbes, and the bacterial microbes in the preferred embodiment of the fertilizer product include spores of one or more of the following Mycorrhizae that are listed below in tabular format:

| Endomycorrhizae | Ectomycorrhizae |
|---|---|
| Glomus intraradices | Pisolithus tinctorius |
| Glomus etunicatum | Scleroderma cepa |
| Glomus mosseae | Scleroderma citrinum |
| Glomus aggregatum | Rhizopogon villosulus |
| | Rhizopogon amylopogon |
| | Rhizopogon fulvigleba |

In the preferred embodiment, the fertilizer product is comprised of water soluble soy protein with *Nitrosopumilus maritimus* microbes, microbes from all three bacterial species mentioned above, and one or more of the Mycorrhizal fungal spores listed immediately above. In this preferred embodiment, the Archae, the bacteria, and the Mycorrhizae in the fertilizer product work in combination to support plant health and enhance plant growth, while the soluble soy protein serves as an available source of nitrogen for growing plants. The Archae work to decompose and break down harmful contaminants in the soil, break down minerals in the soil into usable form, and aid in the Nitrogen Cycle. The beneficial bacteria microbes also work in combination with the Archae to aid in decomposition of minerals in the soil and to facilitate the uptake of macronutrients and micronutrients required by the growing plants. The mycorrhizal fungi work mutualistically with the plant roots and serve similar to extensions of the plant roots and rhizome allowing the plant to intake the macronutrients and micronutrients made more available in the soil through the joint action of the Archae and the beneficial bacteria.

In an alternative embodiment of the invention claimed herein, the fertilizer is comprised of water soluble soy protein and selected beneficial bacterial microbes. This embodiment contains beneficial bacterial microbes that aid in the Nitrogen Cycle and in nitrogen fixation making use of the available nitrogen provided in the water soluble soy protein for enhancing soil fertility and plant nourishment. One or more of the following bacterial microbes may be used in this embodiment: *Bacillus subtilis, Bacillus lichenformis*, and *Paenibacillus durum*, however, the bacterial microbes that may be used in this embodiment are not limited to those specific species, and may be any other beneficial bacterial microbes that are capable of aiding in an aspect of the Nitrogen Cycle or in nitrogen fixation and which may make use of the plant based amino acids found in the water soluble soy protein for the nourishment of plants.

The water soluble soy protein used in the invention is the primary source of nitrogen in the invention. However, the fertilizer product and each of the embodiments disclosed herein can also be made to further comprise kelp powder, which is a known organic source of not only nitrogen, but also phosphorous and potassium, all of which are necessary macronutrients required for plant growth. Kelp powder is also a source for a number of micronutrients and trace minerals that are helpful in enhancing plant growth. In addition to the nitrogen, phosphorous, and potassium that are contained within the soluble soy protein and kelp powder, where kelp powder has been added as a constituent of the fertilizer product, potassium salts and phosphates may be added to further increase the phosphorous and potassium content of the fertilizer. Potassium sulfate and soft rock phosphate (which is primarily phosphorous pentoxide, some calcium oxide, and trace minerals) are the preferred additions to the fertilizer product in terms of addition of more usable phosphorous and potassium.

A variety of sugars may also be added into the embodiments of the fertilizer product discussed above. For instance, Glucose, Sucrose, Fructose, Clintose, Dextrose, or a Clintose/Dextrose mixture may be combined with the fertilizer product in order to provide additional sugars for both microbial and plant growth. Various calcium salts may also be added to the fertilizer product for enhancing plant growth. Calcium citrate, calcium carbonate, or both, are believed to be the preferred candidates for inclusion with the fertilizer product in order to boost calcium levels in the soil.

Humic acid or potassium humate may also be added to the fertilizer product. Humic acid and potassium humate aid in plant growth and in root growth, build up useful organic molecules in the soil, and helps with soil remediation by trapping harmful organic and inorganic compounds found in the soil. A mixture of calcium ligonosulphonate, wood sugars, and carbohydrates may also be included in the fertilizer product to further enhance plant growth The addition of an anti-caking agent may also be desirable. Ground rice hull powder has been the primary anti-caking agent that is a candidate for inclusion in the fertilizer product since it is an organic substitute for traditional anti-caking agents.

What is claimed is:

1. A fertilizer comprised of water soluble soy protein, Archae microbes, and fungal spores.
2. The fertilizer of claim 1 further comprising bacterial microbes.
3. The fertilizer of claim 1, wherein the Archae microbes are of the species *Nitrosopumilus maritimus*.
4. The fertilizer of claim 2 wherein the Archae microbes are of the species *Nitrosopumilus maritimus*.
5. The fertilizer of claim 1 wherein the fungal spores are Mycorrhizal fungal spores selected from the group consisting of *Glomus intraradices, Glomus etunicatum, Glomus mosseae, Glomus aggregatum, Pisolithus tinctorius, Scleroderma cepa, Scleroderma citrinum, Rhizopogon villosulus, Rhizopogon amylopogon,* and *Rhizopogon fulvigleba*.
6. The fertilizer of claim 2 wherein the bacterial microbes are selected from the group consisting of *Bacillus subtilis, Bacillus lichenformis,* and *Paenibacillus Durum*.
7. The fertilizer of claim 2 further comprising kelp powder.
8. The fertilizer of claim 7 further comprising Humic Acid.
9. The fertilizer of claim 8 further comprising Clintose and Dextrose.
10. The fertilizer of claim 9 further comprising Potassium Sulfate.
11. The fertilizer of claim 10 further comprising Soft Rock Phosphate.
12. The fertilizer of claim 11 further comprising Calcium Ligonosulphonate.
13. The fertilizer of claim 12 further comprising Calcium Citrate.
14. The fertilizer of claim 13 further comprising Calcium Carbonate.
15. The fertilizer of claim 2 wherein the water soluble soy protein is between 5% and 85% by weight of the fertilizer, the Archae microbes are between 0.25% and 5% by weight of the fertilizer, the fungal spores are between 0.25% and 5% by weight of the fertilizer, and the bacterial microbes are between 0.25% and 5% by weight of the fertilizer.
16. A fertilizer comprised of:
   Water soluble soy protein;
   *Nitrosopumilus maritimus* Archae microbes;
   *Glomus intraradices, Glomus etunicatum, Glomus mosseae, Glomus aggregatum, Pisolithus tinctorius, Scleroderma cepa, Scleroderma citrinum, Rhizopogon villosulus, Rhizopogon amylopogon, Rhizopogon fulvigleba* Mycorrhizae fungal spores;
   *Bacillus subtilis, Bacillus lichenformis,* and *Paenibacillus Durum* bacterial microbes.
17. The fertilizer of claim 16 further comprising kelp powder.
18. The fertilizer of claim 17 further comprising Humic Acid.
19. The fertilizer of claim 18 further comprising Clintose and Dextrose.
20. The fertilizer of claim 19 further comprising Potassium Sulfate.
21. The fertilizer of claim 20 further comprising Soft Rock Phosphate.
22. The fertilizer of claim 21 further comprising Calcium Ligonosulphonate.
23. The fertilizer of claim 22 further comprising Calcium Citrate.
24. The fertilizer of claim 23 further comprising Calcium Carbonate.
25. The fertilizer of claim 24 wherein the water soluble soy protein is between 20% and 60% by weight of the fertilizer, the *Nitrosopumilus maritimus* microbes are between 0.25% and 1.25% by weight of the fertilizer, the Mycorrhizae fungal spores are between 0.25% and 1.25% by weight of the fertilizer, the bacterial microbes are between 0.25% and 1.25% by weight of the fertilizer, the kelp powder is between 2.5% and 7.5% by weight of the fertilizer, the Humic Acid is between 0.75% and 2% by weight of the fertilizer, Clintose is between 1.5% and 10% by weight of the fertilizer, Dextrose is between 1.5% and 10% by weight of the fertilizer; the potassium sulfate is between 4% and 10% by weight of the fertilizer, and the soft rock phosphate is between 4% and 20% by weight of the fertilizer.

* * * * *